United States Patent
Shimizu et al.

(10) Patent No.: US 7,953,428 B2
(45) Date of Patent: May 31, 2011

(54) TRANSMITTING APPARATUS, RECEIVING APPARATUS, AND RE-TRANSMISSION CONTROL METHOD

(75) Inventors: Masahiko Shimizu, Yokosuka (JP); Akira Ito, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 866 days.

(21) Appl. No.: 11/067,288

(22) Filed: Feb. 28, 2005

(65) Prior Publication Data

US 2005/0213543 A1 Sep. 29, 2005

(30) Foreign Application Priority Data

Mar. 23, 2004 (JP) ................................ 2004-085205

(51) Int. Cl.
*H04B 15/00* (2006.01)
(52) U.S. Cl. ....... 455/510; 455/63.1; 455/450; 455/550; 455/464; 455/119; 370/345; 370/255; 370/252; 370/448; 370/380
(58) Field of Classification Search .................. 455/422, 455/456.2, 458, 509, 450
See application file for complete search history.

(56) References Cited

U.S. PATENT DOCUMENTS

| 6,845,237 B2 * | 1/2005 | Moulsley ................... 455/422.1 |
| 2004/0179493 A1 * | 9/2004 | Khan .............................. 370/332 |
| 2005/0207345 A1 * | 9/2005 | Onggosanusi et al. ........ 370/236 |
| 2006/0084475 A1 * | 4/2006 | Ohkubo et al. ............. 455/562.1 |

FOREIGN PATENT DOCUMENTS

| JP | 2002-9741 | 1/2002 |
| JP | 2002-281003 | 9/2002 |

* cited by examiner

*Primary Examiner* — Charles N Appiah
*Assistant Examiner* — Randy Peaches
(74) *Attorney, Agent, or Firm* — Myers Wolin, LLC (57) ABSTRACT

Excessive quality in the receiving apparatus is controlled to obtain the combined gain by distinctively controlling the re-transmission for the first transmission. A transmitting apparatus for transmitting the data to a receiving apparatus to execute regeneration of data using, for example, the received data and the re-transmitted data, comprises a control unit operable to receive an indication that an error has been detected in received data transmitted in a first transmission, to re-transmit the data in a second transmission, and to control resources for re-transmission of the data to use fewer resources for the second transmission than for the first transmission.

10 Claims, 8 Drawing Sheets

TRANSMITTING APPARATUS, RECEIVING APPARATUS, AND RE-TRANSMISSION CONTROL METHOD

BACKGROUND OF THE INVENTION

1. Field of the Invention

The present invention relates to a transmitting apparatus, a receiving apparatus, and a re-transmission control method, and more specifically to a radio base station and a mobile station in the mobile radio communication system having introduced, for example, the W-CDMA (UMTS) communication system.

2. Description of the Related Art

Standardization of the Wideband Code-Division Multiple-Access (W-CDMA, UMTS) system, which is one of the third generation mobile communication system, is now under the development with the $3^{rd}$ Generation Partnership Project (3GPP). As a theme of standardization, the High Speed Downlink Packet Access (HSDPA) is specified to provide a maximum transmission speed of about 14 Mbps for the downlink.

The HSDPA adapts an adaptive modulation and coding (AMC) system which is characterized, for example, in that the QPSK modulation method and the 16-level QAM method are switched adaptively in accordance with the radio communication environment between the base station and mobile station.

Moreover, the HSDPA also adapts the Hybrid Automatic Repeat request (H-ARQ) system. This HSDPA is characterized in that, when a mobile station has detected an error in the data received from the base station, the data is re-transmitted from the base station responding to a request from the mobile station, while the mobile station executes an error correction decoding process using both the already received data and the received data of the re-transmission. In the H-ARQ, as described above, even if an error is detected, the number of times of re-transmission is controlled by effectively utilizing the already received data.

The major radio channels used for the HSDPA include the HS-SCCH (High Speed-Shared Control Channel), HS-PDSCH (High Speed-Physical Downlink Shared Channel), and HS-DPCCH (High Speed-Dedicated Physical Control Channel).

The HS-SCCH and HS-PDSCH are shared channels in the downlink direction (namely, direction toward a mobile station from a base station), and the HS-SCCH is a control channel for sending various parameters of the data transmitted by the HS-PDSCH. The various parameters, for example, may include the modulation type information which indicates the modulation method used for transmission by the HS-PDSCH, the number of spreading codes assigned (number of codes), and information such as the pattern of rate matching for the transmitting data.

Meanwhile, the HS-DPCCH is a dedicated control channel in the uplink direction (namely, direction toward a base station from a mobile station) and is used to transmit the ACK signal and NACK signal to the base station from the mobile station in accordance with acknowledgment or non-acknowledgment of reception of the data received via the HS-PDSCH. If a mobile station has failed in reception of the data (a CRC error is detected in the receive data or the like), the base station executes the re-transmission control because the NACK signal is transmitted from the mobile station.

Moreover, the HS-DPCCH is also used by the mobile station having measured the receiving quality (for example, the signal-to-interference ratio (SIR)) of the signal received from the base station to transmit the result of measurement to the base station as the Channel Quality Indicator (CQI). The base station determines, in accordance with the CQI received, the environment for the radio communication on the basis of the received CQI. When the communication environment is good, the modulation method is switched to a technique for transmitting the data at a higher speed. If the environment is not good, on the contrary, the modulation method is switched to a technique for transmitting the data at a lower speed (namely, adaptive modulation is executed).

Channel Format

Next, a channel format in the HSDPA will be described below.

Figure 1:
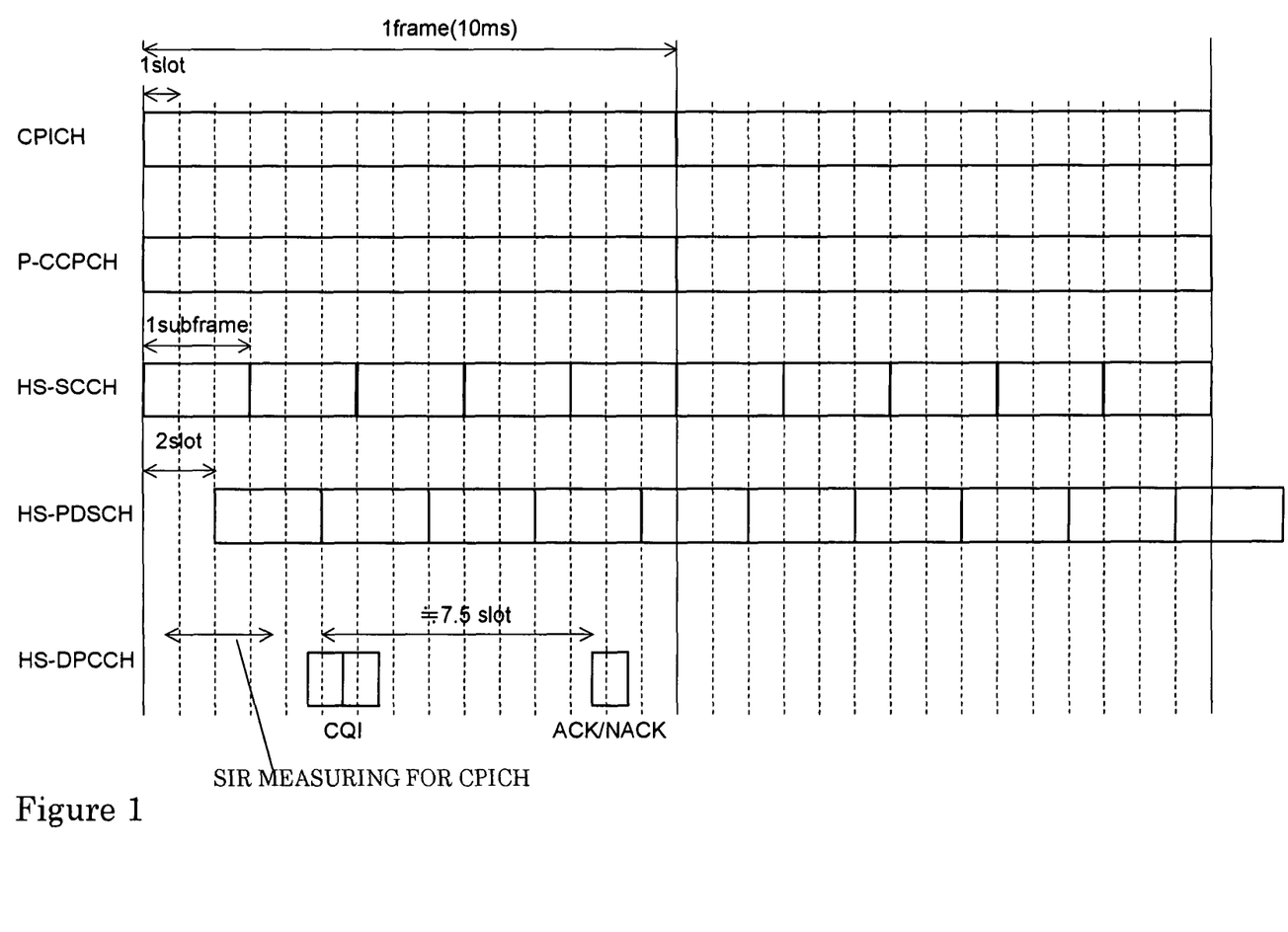
FIG. 1 diagrammatically shows a channel format of the HSDPA.

FIG. 1 is a diagram illustrating a channel format in the HSDPA. The W-CDMA introduces the code dividing multiplex system and each channel is therefore separated with the spreading code.

The channels not yet described will be described briefly first.

CPICH (Common Pilot Channel) and P-CCPCH (Primary Common Control Physical Channel) are respectively common channels in the downlink direction.

The CPICH is the channel used by a mobile station for estimation of channel condition, searching of cells, and timing reference of the other downlink physical channels in the same cell, and the channel used for transmitting the pilot signal. The P-CCPCH is the channel for transmitting the broadcasting information.

Next, timing relationship of channels will be described with reference to FIG. 1.

As illustrated, one frame (10 ms) is formed of 15 slots in each channel. As described previously, since the CPICH is used as the reference of the other channels, the top of frames of the P-CCPCH and HS-SCCH channels are matched with the top of frame of the CPICH channel. Here, the top of frame of the HS-PDSCH channel is delayed by two slots from the HS-SCCH channel or the like to realize demodulation of the HS-PDSCH channel with the demodulating method corresponding to the received modulation type after the mobile station has received the modulation type information via the HS-SCCH channel. Moreover, the HS-SCCH and HS-PDSCH channels form one sub-frame with three slots.

The HS-DPCCH channel is not matched with the CPICH channel but this channel is provided for the uplink direction and is based on the timing generated in the mobile station.

The channel format of the HSDPA has been briefly described above. Next, the processes up to transmission of the transmit data via the HS-PDSCH channel will be described with reference to the block diagram.

Structure of Base Station

Figure 2:
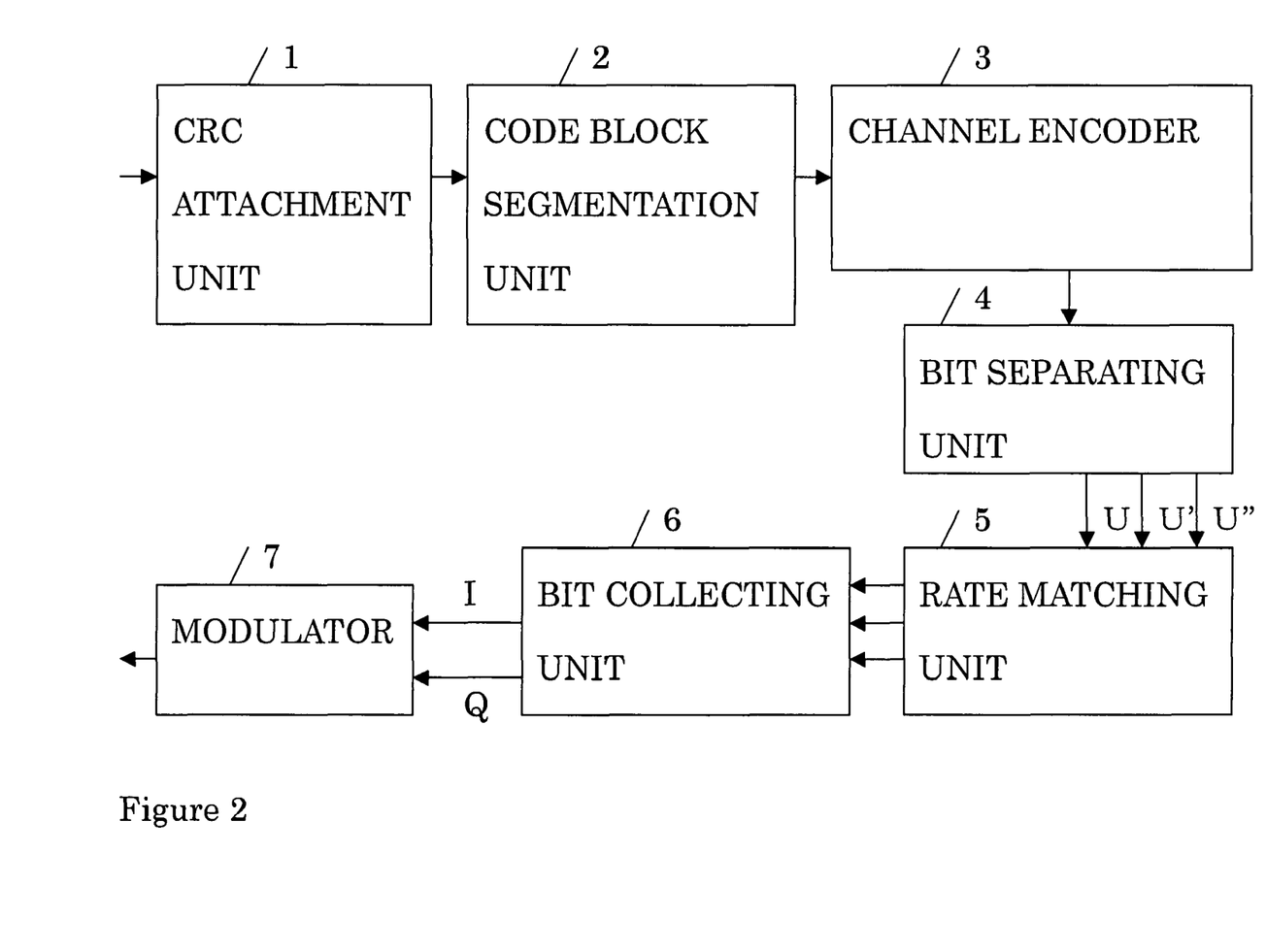
FIG. 2 diagrammatically shows a structure of a base station supporting the HSDPA.

FIG. 2 illustrates a structure of a base station supporting the HSDPA.

In FIG. 2, the reference numeral 1 designates a CRC attachment unit; 2, a code block segmentation unit; 3, a channel encoder; 4, a bit separating unit; 5, a rate matching unit; 6, a bit collecting unit; 7, a modulator.

Next, operations of each block will be described.

The transmitting data transmitted via the HS-PDSCH channel (data accommodated within one sub-frame of the HS-PDSCH channel in FIG. 1) is first subjected to the CRC arithmetic process in the CRC attachment unit 1 and the result of arithmetic operation is added to the last part of the transmitting data. The transmitting data to which the result of CRC arithmetic operation is added is then input to the code block segmentation unit 2 and is then segmented into a plurality of blocks. This process is required to shorten the data length in units of the error correction encoding, considering the load of decoding process in the receiving side. When the data length exceeds the predetermined length, the code block is equally segmented to a plurality of blocks. An integer 2 or larger may be selected as the number of segmentations but the number of segmentations 2 may be selected to simplify the description. If the data length is rather short, segmentation of blocks is unnecessary.

The segmented transmitting data are respectively processed as the object data of the individual error correction encoding process in the channel encoder 3. In other words, the error correction encoding process is respectively executed for the segmented first block and second block. As an example of the channel encoding process, a turbo encoding process may be listed.

Here, the turbo encoding process will be described briefly. In the turbo encoding process, when the data as the object of the encoding process is defined as U, the data U itself, the data U' obtained by the convolutional encoding of the data U, and the data U" obtained by the convolutional encoding of the data U after the interleave (re-arrangement) process of the data U may be output. Here, the data U is called the systematic bits and can be understood, in the turbo decoding process, as the data used in two element decoders and the data having a higher degree of importance because the application frequency is high. On the other hand, the data U', U" are parity (redundant) bits. These bits are data used only in one of the two element decoders and can be understood as the data having a degree of importance which is lower than that of the data U because the application frequency is low.

Namely, it can be said that since the systematic bits have the higher degree of importance than that of the parity bits and the systematic bits are received more correctly, a more accurate decoding result can be obtained with the turbo decoder.

The systematic bits and parity bits generated as described above are input as serial data to the bit separating unit 4 and this bit separating unit 4 separates the input serial data into the data U, U', U" of three systems and then outputs these data as parallel data.

The rate matching unit 5 performs the puncture process for deleting the bits with the predetermined algorithm and also executes the repetition process to repeat the bits in order to store the data within the sub-frame formed of three slots of the HS-PDSCH channel.

As described above, the bits having completed the bit adaptation process to the sub-frame are then input in parallel to the bit collecting unit 6.

The bit collecting unit 6 generates bit sequences wherein each bit sequence including four bits indicating one signal point, for example, of 16-level QAM modulation based on the input data, and then outputs these bit sequences. At the time of generation of bit sequences, the systematic bits are preferably arranged, for the first transmission, in the side of upper bits in which an error is not easily generated.

The modulator 7 outputs the signal of the 16-level QAM modulation to provide the amplitude and phase corresponding to the signal points indicated with the input bit sequence and then transmits the signal to the antenna (not illustrated) after conversion to radio frequency through frequency conversion.

The HSDPA is well-known and is disclosed, for example, in the Japanese Published Unexamined Patent Applications Nos. 9741/2002 and 281003/2002, and in the non-patent document "3G TS 25. 212" ($3^{rd}$ Generation Partnership Project: Technical Specification Group Radio Access Network; Multiplexing and channel coding (FDD)).

According to the background technology described above, when a base station receives the NACK signal from a mobile station, the base station executes a re-transmission. However, in this case, the re-transmission is made in using transmission power similar to that of the first transmission because a particular control in which the re-transmission power is different from that of the first transmission is never performed.

However, as described previously, when the received data is reproduced (decoded) through combining of both the signal received first and the signal received by the re-transmission, the combined gain is obtained.

Accordingly, the re-transmission is executed with a transmission power similar to that of the first transmission even when it is not required in order to correct the error that occurred in the first transmission. This means that the re-transmission is performed with excessive quality.

Therefore, a need arises for a technique to control excessive quality in the receiving apparatus by selectively controlling the re-transmission for the first transmission.

SUMMARY OF THE INVENTION

Therefore, an object of the present invention is to control excessive quality in the receiving apparatus which can obtain the combined gain by selectively controlling the re-transmission for the first transmission.

Another object of the present invention can also be found in the effect, other than the effect described above, which cannot be attained with the prior art but with each structure of the preferred embodiment of the present invention described later.

The present invention uses a transmitting apparatus for transmitting data to a receiving apparatus to reproduce data using a already received data and a re-transmitted data, the transmitting apparatus comprising a control unit for controlling radio resource for the re-transmission to few or less radio resource than radio resource for a first transmission.

The present invention uses a transmitting apparatus for transmitting data to a receiving apparatus to reproduce data using a already received data and a re-transmitted data, the transmitting apparatus comprising a first control means for executing a control to change a transmission parameter for transmission and a second control means for controlling said control in the direction to reduce consumption of radio resource for the re-transmission:

The present invention uses a receiving apparatus to reproduce data using the received data and re-transmitted data, comprising a feedback unit for feeding back the likelihood degree information of receiving data or the information calculated from said likelihood degree information to a transmitting apparatus which can control a transmission parameter at the time of retransmission. The information calculated from said likelihood degree information includes the information to identify the transmission parameter to be changed.

The present invention uses a transmitting apparatus for transmitting data to the receiving apparatus to reproduce data using received data and re-transmitted data, the transmitting apparatus comprising a receiving unit for receiving, from said receiving apparatus, the likelihood degree information of the received data or the information calculated from said likelihood degree information and a control unit for determining transmission parameters at the time of re-transmission and executing the re-transmission using the determined parameter on the basis of the information obtained by said reception.

The present invention uses a CDMA mobile communication system for executing the re-transmission to which the hybrid ARQ system is adopted between a base station and mobile stations, comprising a control unit for controlling a lower transmitting power or a fewer number of spreading codes to be used or a higher spreading factor for the re-transmission than a transmission power, a number of spreading codes, or a spreading factor for a first transmission.

The present invention uses a CDMA mobile communication system including base stations for executing adaptive modulation on the basis of the CQI information from mobile stations and also for executing a re-transmission according to the hybrid ARQ, comprising a control unit for controlling a lower transmission power, a fewer number of spreading codes to be used or a higher spreading factor for the re-transmission than a transmission power, a number of spreading codes, or a spreading factor according to said adaptive modulation on the basis of the CQI information.

DETAILED DESCRIPTION OF THE PREFERRED EMBODIMENTS

The preferred embodiments of the present invention will be described with reference to the accompanying drawings.

Description of the First Embodiment

Figure 3:
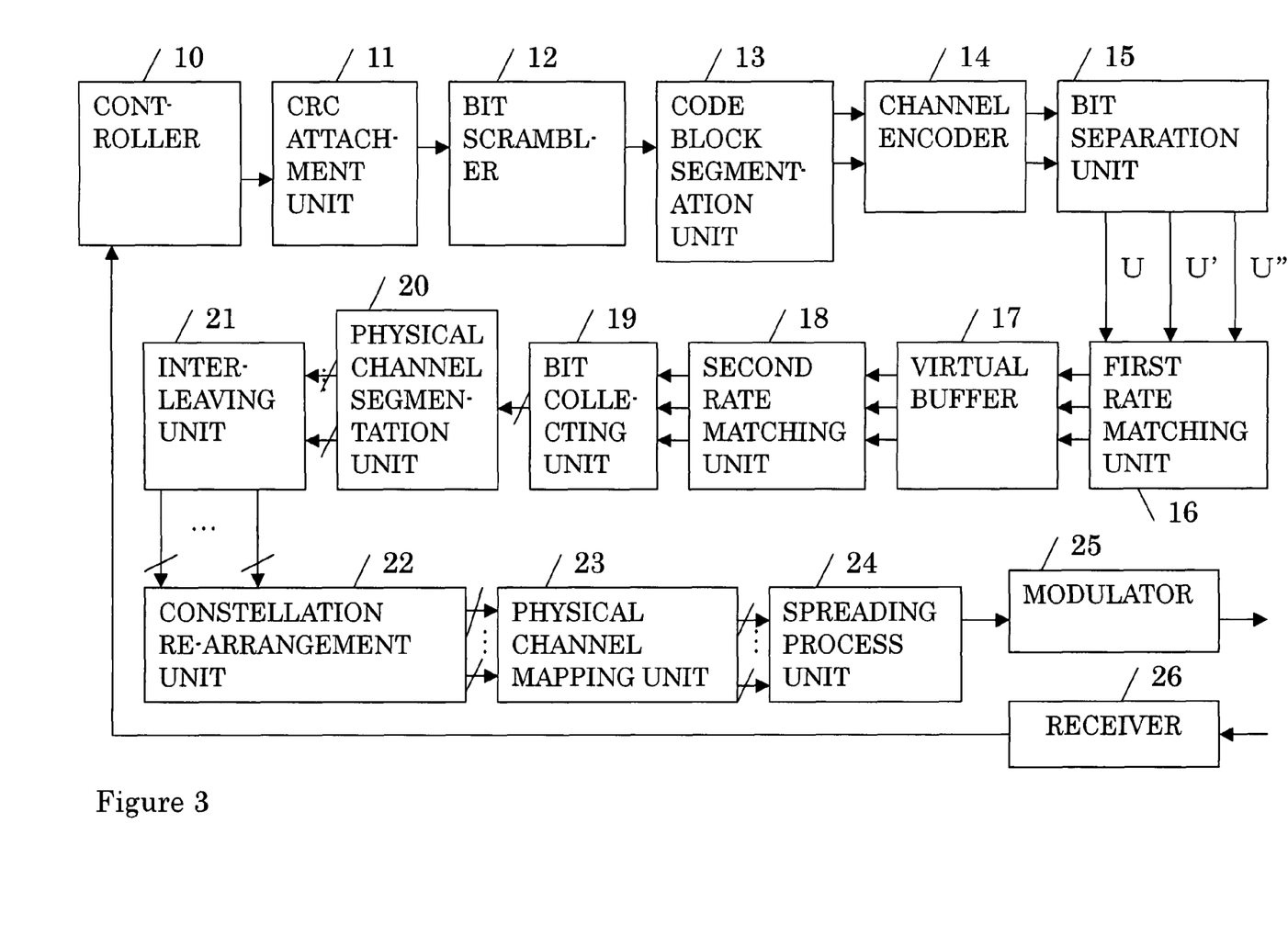
FIG. 3 diagrammatically shows a transmitting apparatus of the present invention.

FIG. 3 illustrates a transmitting apparatus of the present invention.

As an example of the transmitting apparatus, a transmitting apparatus (radio base station) of the W-CDMA (UMTS) communication system corresponding to the HSDPA described previously will be described. This transmitting apparatus can also be adapted to the transmitting apparatus of the other communication system.

In FIG. 3, numeral 10 designates a controller (control unit) for sequentially outputting the transmit data (data to be transmitted within one sub-frame) to be transmitted via the HS-PDSCH and controlling each unit (11 to 26 or the like). Major control processes of the control unit 10 may be listed as follows.

(1) Control of re-transmission on the basis of the NACK signal received by a receiver (receiving unit) 26 described later.

(2) Control of the transmission parameters used for the re-transmission in the direction to save the radio resources for the first transmission by discriminating the re-transmission from the first transmission.

As the examples of the radio resources, transmission power, number of transmitting antennas, number of spreading codes, number of carriers or the like may be listed.

Since the HS-PDSCH is the shared channel, it is permitted that the sequentially output transmitting data are respectively transmitted to different mobile stations.

The numeral 11 designates a CRC attachment unit for executing the CRC arithmetic operation to the sequentially input transmit data (data transmitted within the same radio frame) and adding the result of CRC arithmetic operation to the last part of the transmit data. Numeral 12 designates a bit scrambling unit which forms the randomized transmitting data by scrambling, in units of bits, the transmit data to which the result of the CRC arithmetic operation is added.

Numeral 13 designates a code block segmentation unit which segments (into the two blocks) the input transmitting data having completed bit scrambling if this transmit data exceeds the predetermined data length. This is done to prevent an increase in the amount of arithmetic operations of the decoder on the receiving side due to the data making up the decoding object becoming too long in the channel coding to be executed next. In FIG. 3, the input data length exceeds the predetermined data length and the data segmented into the two blocks (segmented to the first data block and second data block) are output. The number of segmentations other than 2 may naturally be selected and moreover the transmit data can also be segmented in different data lengths in place of the segmentation in equal data length.

Numeral 14 designates a channel encoder (channel coding unit) for individually executing the error correction encoding on the segmented data. As the channel encoder 14, the turbo encoder described above is preferably used here.

As described previously, the first output includes, for the first block, the important systematic bits (U) which is the identical data to the data in the encoding object, the first parity (redundant) bits (U') obtained by convolutional encoding of the systematic bits (U) and the second parity bits (U") obtained by the similar convolutional encoding of the systematic bits after the interleave process. In the same manner, the second output includes, for the second block, the systematic bits (U), first parity bits (U') and second parity bits (U"). The coding rate is considered as one of the transmission parameters.

When the coding rate is improved (increased), the number of parity bits is reduced. Therefore, the spreading factor (SF) as a transmission parameter can be improved (the number of chips of the spreading codes to be assigned to one symbol is increased) and the number of spreading codes used for other communication may also be increased. The spreading factor may be improved, when the chip rate is fixed, by expanding the data width.

Moreover, when transmission is made using a plurality of spreading codes because a large number of data is used, the number of parity bits can be reduced. Therefore, the number of spreading codes to be used can be reduced and the number of spreading codes used as the transmission parameters can be saved.

Numeral 15 designates a bit separation unit for separately outputting the systematic bits (U) of the first block and second block input serially from the channel encoder 14 (turbo coder), the first parity bits (U') and the second parity bits (U"). This process can also be adapted to the second block. Accordingly, only the output corresponding to the first block is illustrated.

Numeral 16 designates a first rate matching unit for executing the rate matching process such as the puncture process (thinning) to the input data to provide the input data (all data of the segmented blocks when the data is segmented to a plurality of blocks) to be stored in the predetermined region of the virtual buffer unit 17 of the subsequent stages.

Numeral 17 designates a virtual buffer unit which is controlled by the controller 10 to set a region corresponding to the receiving process capability of the mobile station as the transmission object and stores the data having completed the rate matching process by the first rate matching unit 16. During the re-transmission, the processes to be executed by the CRC attachment unit 11 to the first rate matching unit 16 can be eliminated by outputting the data stored in the virtual buffer, but when it is requested to change the coding rate during the re-transmission, it is desirable that the transmit data stored by the controller 10 is output again without use of the stored data. Here, it is also possible that the buffer is not provided. In this case, the re-transmission data is output again from the controller 10.

Numeral 18 designates a second rate matching unit for adjusting the data to the data length which can be stored by the controller 10 in the designated one sub-frame. The data length of input data is adjusted to provide the designated data length by executing the puncture process (thinning) and repetition process (repeating).

A symbol rate can be lowered by increasing the number of bits to be deleted as a result with the puncture process or the like in the first rate matching unit 16 or the second rate matching unit 18. A rate matching pattern is one of the transmission parameters and the spreading factor as a transmission parameter can be increased (the number of chips of the spreading codes to be assigned to one symbol is increased) and the number of spreading codes used for other communications can also be increased by changing the rate matching pattern to the pattern in which a less amount of data is output. When the chip rate is fixed, the spreading factor can be increased by widening the data width.

Moreover, when transmission is made using a plurality of spreading codes, since a large amount of data is used, the amount of transmit data is reduced and therefore the number of spreading codes to be used can be reduced and the number of spreading codes as the transmission parameter can be saved.

Numeral 19 designates a bit collection unit for arranging the data from the second rate matching unit 19 into a plurality of bit sequences. Namely, a plurality of bit sequences for indicating the signal points on the respective phase planes can be output by arranging both first block data and second block data with the predetermined bit arrangement method. In this embodiment, each bit sequence is formed with four bits because the 16-level QAM modulation method is employed. When the 64-level QAM modulation method is used, the each bit sequence is formed of six(6) bits. When the QPSK modulation scheme is used, the each bit sequence is formed of two(2) bits.

Here, the number of bits of the bit sequence (value of N for N-level modulation) is considered as one of the transmission parameters. The rate of symbols formed of the bit sequence can be lowered, the spreading factor as a transmission parameter can be increased (the number of chips of the spreading codes assigned to one symbol is increased), and the number of spreading codes used for other communications can be increased by increasing the number of bits of the bit sequence.

Moreover, when transmission is made using a plurality of spreading codes because a large amount of data is used, the amount of data which can be assigned to one signal point can be increased by increasing the number of bits of the bit sequence. Accordingly, the number of spreading codes to be used can be reduced and the number of spreading codes as a transmission parameter can be saved.

Numeral 20 designates a physical channel segmentation unit which can output the segmented bit sequence to the systems in the same number as the number of assigned spreading codes (number of assigned codes) indicated by the controller 10. Namely, this unit can provide an output by sequentially sharing the input bit sequences to the systems 1 to N, when the number of codes in the transmitting parameters indicated by the controller 10 is N.

Numeral 21 designates an interleaving unit for outputting the bit sequences of the N systems by executing the interleaving process on such bit sequences.

Numeral 22 designates a constellation re-arrangement unit for 16-level QAM which can execute the re-arrangement of the bits within the bit sequences for each input bit sequence. For example, it is also possible that at the time of the first transmission, each input bit is output directly without any processing, and during the re-transmission in the H-ARQ described above, re-arrangement of bits can also be executed. The re-arrangement of bits means, for example, the process of replacing the upper bits with the lower bits. Accordingly, it is preferable to perform the replacement of the bits depending on the equal rule for a plurality of bit sequences. The bit sequences in the re-transmission can also be output directly without any processing.

Numeral 23 designates a physical channel mapping unit for sharing the bit sequences of the N systems in the subsequent stage into the corresponding spreading part of the spreading process unit 24 in the subsequent stage.

Numeral 24 designates a spreading process unit which is provided with a plurality of spreading units to respectively output the corresponding I and Q voltages on the basis of each bit sequence of the N systems and also to provide an output by executing the spreading process using different spreading codes. As described previously, when the symbol rate can be lowered by changing the coding rate, the rate matching pattern and the value N during the N-level modulation as transmission parameters, many chips of the spreading code can be assigned to one symbol and the number of spreading codes used for other communications can also be increased. Moreover, when the number of spreading codes used is reduced, the spreading part to be used can be reduced and it can also be assigned to the other transmissions.

Numeral 25 designates a modulator for combining the signals spread by the spreading process unit 24, executing, on the basis of the combined signals, amplitude phase modulation such as the 16-level QAM modulation method, amplifying the signal with a variable gain amplifier, and then transmitting the signal as a radio signal after such signal is output to the antenna through frequency conversion into a radio signal. Here, the distance between the signal points during modulation is considered as one of the transmission parameters because the transmission power as a radio resource can be controlled, although an error may be generated easily, by narrowing the distance between the signal points.

In the HSDPA, since the signals to the other mobile stations may be multiplexed with the spreading codes even in sub-frames having the same timing, it is preferable that a plurality of sets of the units 10 to 25 and variable gain amplifier or the like (referred to as the transmission set) may be provided and the signal is transmitted to the antenna after common frequency conversion through the combining of the output signals from the variable gain amplifiers. Since the signals must be separated depending on the spreading code, different spreading codes are used, of course, to respectively separate the spreading codes used in the spreading process unit 24 in each transmission set.

Here, the gain of the variable gain amplifier is considered as one of the transmission parameters. Namely, when the maximum transmission power after the combining with the other transmission set is restricted, the transmission power may be shared to the other transmission set by simply lowering the gain and moreover, radio resources may be saved as a result by lowering the interference with the other signals.

Numeral 26 designates a receiving unit which receives the signal from the mobile station via the HS-DPCCH and then gives the ACK or NACK signals and the CQI or the like to the controller 10.

Names and operations of respective units are described above.

When a base station is provided the supports MIMO (multi-input, multi-output), the base station can individually transmit the signals by providing a plurality of antennas. Namely, the signal applied to the first spreading process unit 24 from the physical channel mapping unit 23 is transmitted from the first antenna, while the signal applied to the second spreading process unit 24 is transmitted from the second antenna.

Accordingly, different data can be transmitted from different antennas to the same mobile station. The spreading codes in the first spreading unit and the second spreading unit must be different spreading codes when the data is transmitted from the same antenna. However, when the MIMO is used as described above, the same spreading code may be used. Accordingly, when it is assumed that the N systems must be transmitted to the same mobile station and M antennas are provided for MIMO, it is enough when the [N/M] spreading codes are used for the mobile station. (Here, [n] is the minimum integer equal to or larger than n.) More preferably, the spreading code used for spreading of the signal to be transmitted from the first antenna and second antenna uses an output from the common spreading code generator. Therefore, the spreading code generator may be used in common.

In this case, accordingly, the amount of data to be transmitted or the like may be controlled by changing the number of antennas used for transmission to a mobile station of a communication partner. Namely, when it is assumed that M antennas are provided, L channels may be assigned in the same manner as the assignment of L spreading codes by assigning the L antennas (L≦M) for transmission of the signal to only one mobile station. As described above, the number of antennas assigned when the MIMO is employed is considered as one of the transmission parameters and belongs to the transmission parameters which may be controlled by the controller 10.

In the MIMO, individual data can be transmitted with each antenna but the number of antennas for a mobile station can be reduced by introducing an adequate measure, for example, a coding rate as the transmission parameter described above is improved (increased), the value N of N-level modulation is increased, or the number of bits not transmitted is increased by changing the rate matching pattern.

Moreover, when the base station corresponds to the orthogonal frequency division multiplexing (OFDM) system, the number of sub-carriers used for transmission to one mobile station is considered as one of the transmission parameters and this data belongs to one of the parameters to be controlled by the controller 10. The number of sub-carriers can be reduced by taking adequate measures, as described above, such as increasing the coding rate as the transmission parameter, increasing the value of N of the N-level modulation, or increasing the number of bits not transmitted through change of the rate matching pattern.

Process by the Control Unit 10

Next, processes by the control unit 10 regarding the re-transmission control will be described in detail with reference to FIG. 4.

Figure 4:
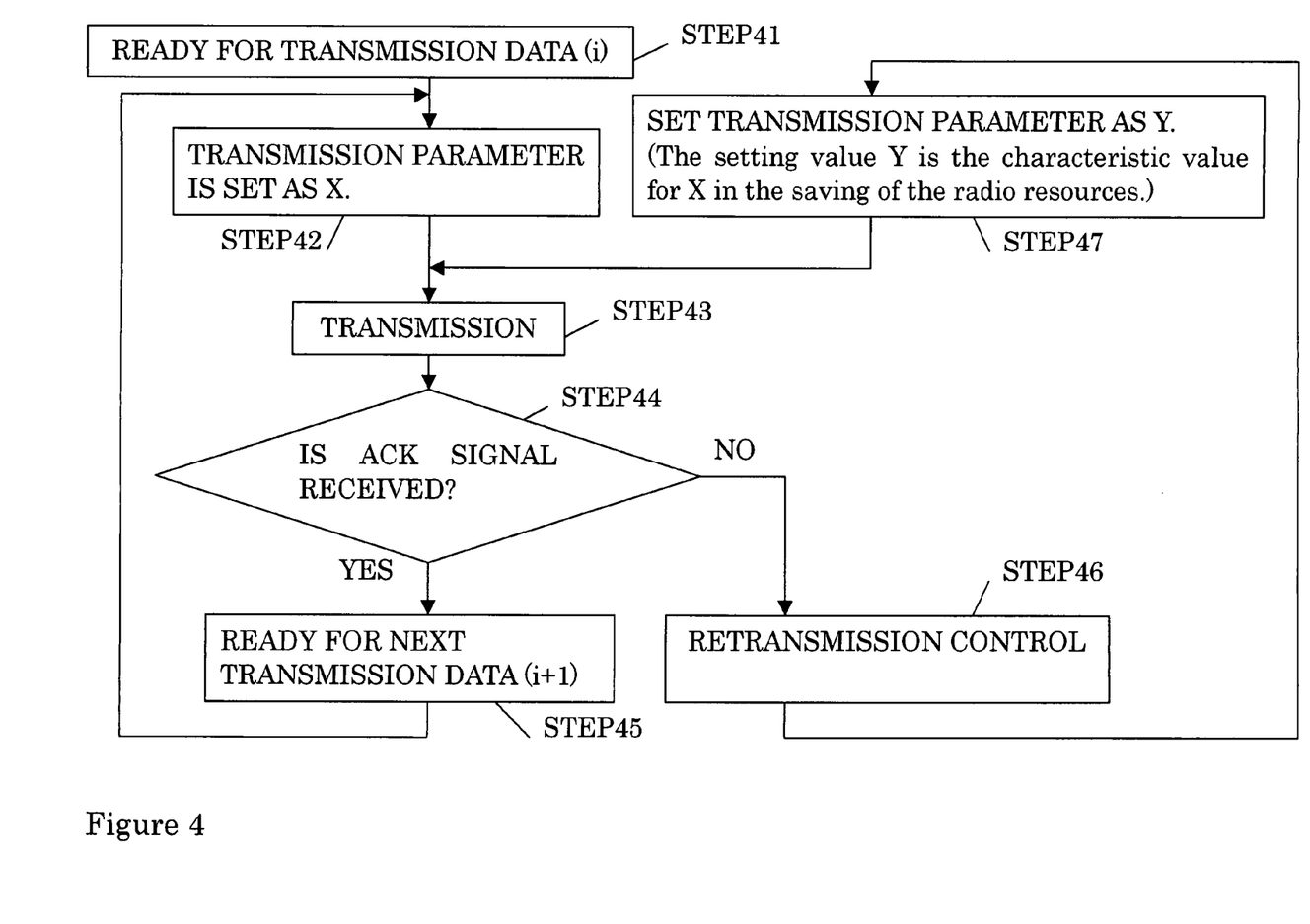
FIG. 4 diagrammatically shows the process 1 of the control unit 10 of the present invention.

FIG. 4 illustrates a flowchart of the process 1 by the control unit 10.

The control unit 10 prepares first the transmit data i as the data to be transmitted (step 41). This transmitting data may be considered, for example, as the data to a mobile station received from the side of the base station control apparatus.

The transmission parameter is set as X (step 42) for the transmission (step 43). As the transmission parameters, for example, the coding rate in the channel encoder 14, the rate matching pattern in the first or second rate matching units 16, 17, the number of separation depending on the number of spreading codes in the physical channel segmentation unit, the spreading factor in the spreading process unit 24, the modulation method (N kinds in total from 1 to N), the gain of the variable gain amplifier (not illustrated) for amplifying the data before the combining of the output of the modulating unit 25 and the signal to the other mobile station, and the number of transmitting antennas (not illustrated) for employment of the MIMO system, may be listed and these values are set to the corresponding parts as X1, X2 . . . Here, X indicates combination of these transmission parameters (Xi).

After reception of the ACK or NACK signals, which are transmitted in accordance with the result of error detection (result of CRC check) for the receive data, from a mobile station as the receiving apparatus described later after the transmission of signal, it is determined whether the ACK signal has been received or not within the predetermined period (step 44). Here, when the ACK signal has been received, the next transmit data i+1 is prepared as the transmiting data (step 45) and the process returns to the step 42.

Meanwhile, when the NACK signal is received from the mobile station or the ACK signal is not received within the predetermined period, the re-transmission control process starts (step 46). Namely, the data i which has failed in transmission is output and a re-transmission is conducted. The control unit 10 is preferably provided with a storage unit for storing the transmit data i for the period until the ACK signal is received in order to repeat the transmission by reading the data from such storage unit.

When the re-transmission control process starts, the transmission parameter is set to Y (step 47) and the re-transmission is executed. Here, the transmission parameter is changed to Y from X to indicate that at least any one of the parameters of Xi is different. Moreover, the setting value Y is the characteristic value for X in the saving of the radio resources.

The number of codes which may be used as a result for other communications is increased, for example, by conducting any one of the below listed items (1) to (3), in which (1) the coding rate in the channel encoder 14 is increased, (2) the amount of data is reduced by changing the rate matching pattern in the first or second rate matching units 16, 17, and (3) the number of bits of the bit sequence is increased in the bit collecting unit 19 and the value N for N-level modulation is increased in the modulating unit 25, and moreover by increasing the spreading factor or reducing the number of spreading codes to be used. Moreover, the transmission power is controlled (lowered) as a result by changing the modulation method in the modulating unit 25 to that the distance between the signal points is narrowed.

In addition, the transmission power is simply lowered by reducing the gain of the variable gain amplifier (not illustrated) for amplifying the signal before combining of the output of the modulating unit 25 and the signal to the other mobile station.

Moreover, the number of transmitting antennas (not illustrated) when the MIMO is introduced is reduced by (1) increasing the coding rate in the channel encoder 14, or (2)

increasing the number of bits to be punctured in the rate matching pattern in the first or second rate matching units 16, 17, or (3) increasing the value N of the N-level modulation.

As described above, since the control unit 10 changes the transmission parameters, at the time of re-transmission, in the direction to save the radio resources, transmission in excessive quality to the receiving apparatus (mobile station) to obtain the combined gain as in the case of H-ARQ or the like can be controlled. It is preferable here that control unit 10 uses the saved radio resources for communications with other mobile stations.

Other processes in the Control Unit 10

Figure 5:
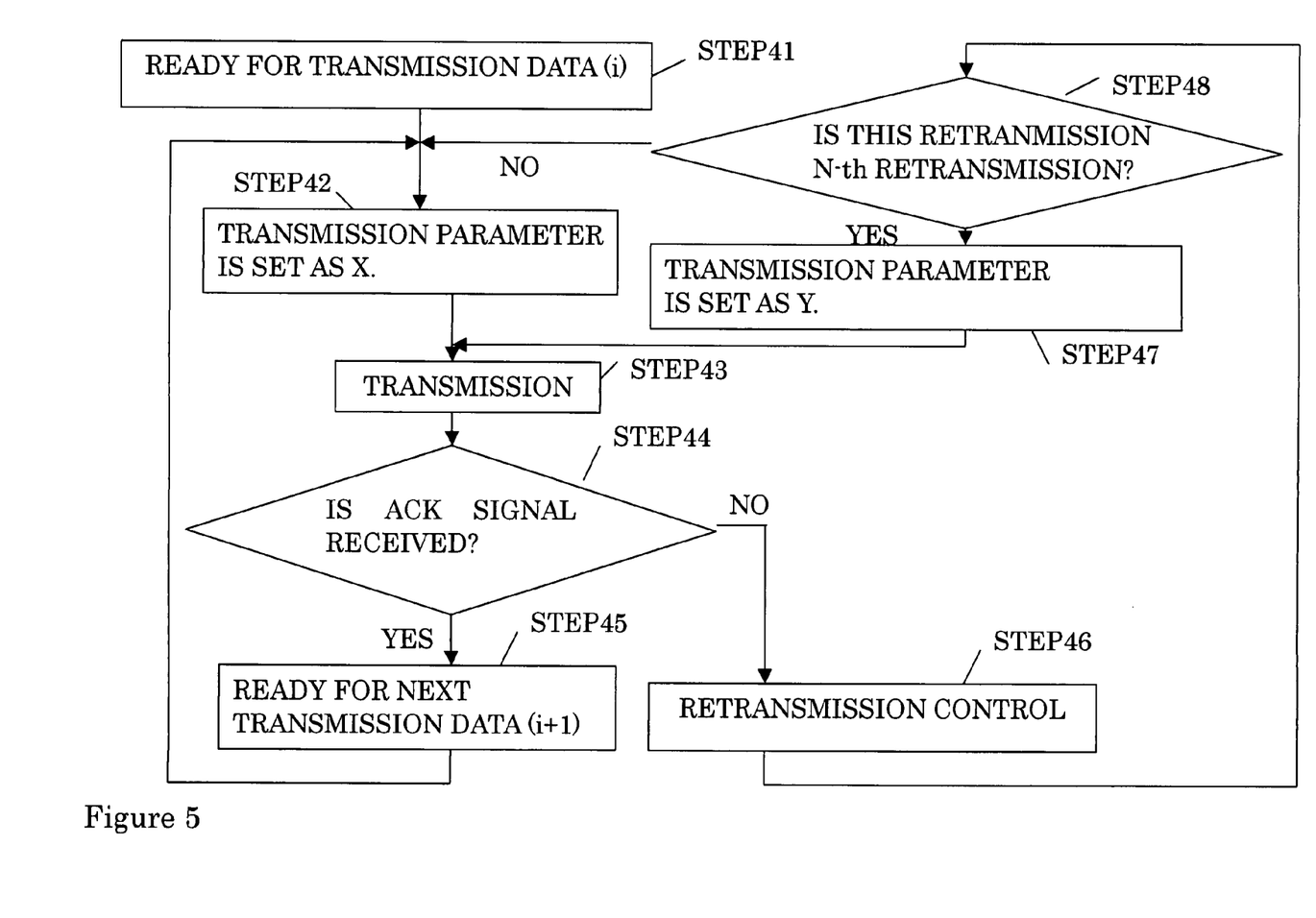
FIG. 5 diagrammatically shows the process 2 of the control unit 10 of the present invention.

FIG. 5 illustrates the other process as the process in the control unit 10.

The added step 48 which is the characteristic step will be described here. For the other steps, refer to the above description.

When the re-transmission control process starts in the step 46, it is determined whether this re-transmission is the N-th re-transmission or not. Here, when the re-transmission is the N-th re-transmission, the transmission parameter is set to Y. If the re-transmission is not the N-th re-transmission, the transmission parameter is set to X even when the re-transmission is executed.

Here, it is considered to set the value N as 1, 2, ... or as a plurality of these values (two values or the like).

Since the mobile station is considered to obtain a larger combining gain as it performs the re-transmission a larger number of times, the value of N can be set to a larger value. However, from the point of view of controlling excessive quality, it is also more profitable that such value of N is set to a smaller value. For example, it is preferable to set the value N to 1 (N=1) (first re-transmission) and to L (N-L: the maximum number of times of re-transmission) (last re-transmission).

Next, the receiving apparatus of the present invention will be described.

Description of the Receiving Apparatus (Mobile Station)

Figure 6:
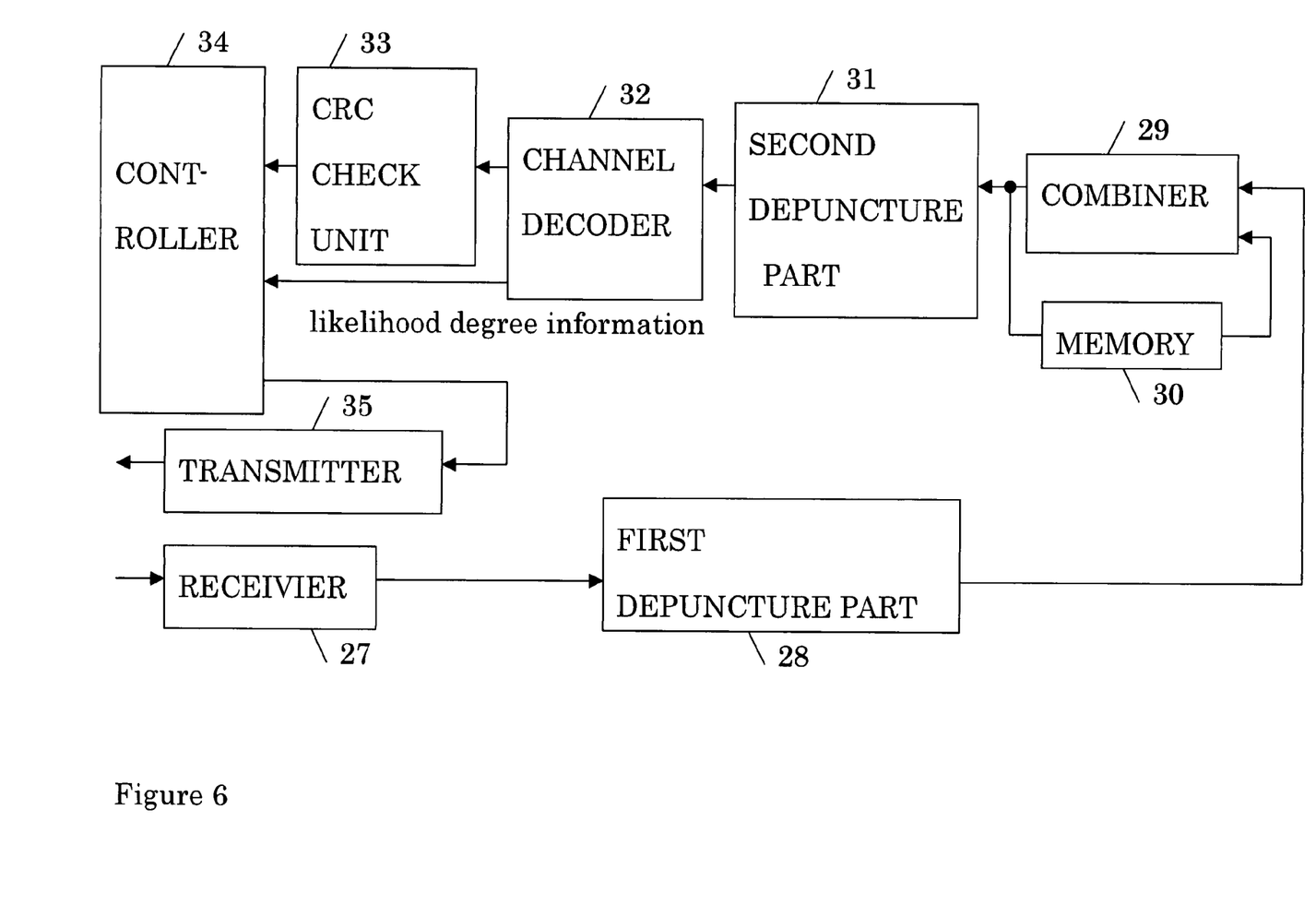
FIG. 6 diagrammatically shows a receiving apparatus of the present invention.

FIG. 6 illustrates the receiving apparatus of the present invention.

As an example of the receiving apparatus, a receiving apparatus (mobile station) in the W-CDMA communication system corresponding to the HSDPA described previously will be described. A mobile station corresponding to the MIMO or OFDM system can naturally be formed just like the base station by providing a plurality of antennas.

In FIG. 6, numeral 27 designates a receiving unit which outputs demodulated signal by executing the orthogonal detection and despreading process or the like to the received signal. In view of utilizing the soft-determination information in a channel decoder 32 described later, an output of the receiving unit 27 also includes the soft-determination information.

Numeral 28 designates a first depuncture unit to insert the information of likelihood 0 to the bit position deleted by the puncture process corresponding to the inverse process of the process in the second rate matching unit 18. Adverse effect on the error correction decoding process in the channel decoding unit 32 can be controlled by inserting information of likelihood 0.

The rate matching pattern in the second rate matching unit 18 may be changed for each transmission. However, since such pattern can be recognized previously by the control unit 10 through the HS-SCCH, the control unit 10 controls the first depuncture unit 28 to execute the depuncture process corresponding to the pattern notified from the base station for each reception of data.

Numeral 29 designates a combiner and numeral 30 designates a memory. The data related to the first transmission is output directly to the second depuncture unit 31 and is then stored in the memory 31. Meanwhile, the transmitting data of the second and subsequent transmissions are combined with the data stored in the memory 30 and are then output to the second depuncture unit 31 and the combined data is then stored again in the memory 30. For execution of the combining process, it is considered, for example, to obtain the average of the likelihood degree information. Namely, when the likelihood degree is high only in the first reception but such likelihood degree is low in the subsequent receptions, the likelihood degree is lowered for that of the first transmission through the combining process.

Numeral 31 designates a second depuncture unit which inserts the information of likelihood 0 to the bit location deleted by the puncture process corresponding to the inverse process of the process in the first rate matching unit 16.

Numeral 32 designates a channel decoder which outputs the data after error correcting decode by executing the error correction decoding process such as the turbo decoding or the like on the basis of the output from the second depuncture unit 31.

Here, the structure for using the turbo decoder as an example of the channel decoding unit 32 will be described briefly.

Structure of Turbo Decoder

Figure 7:
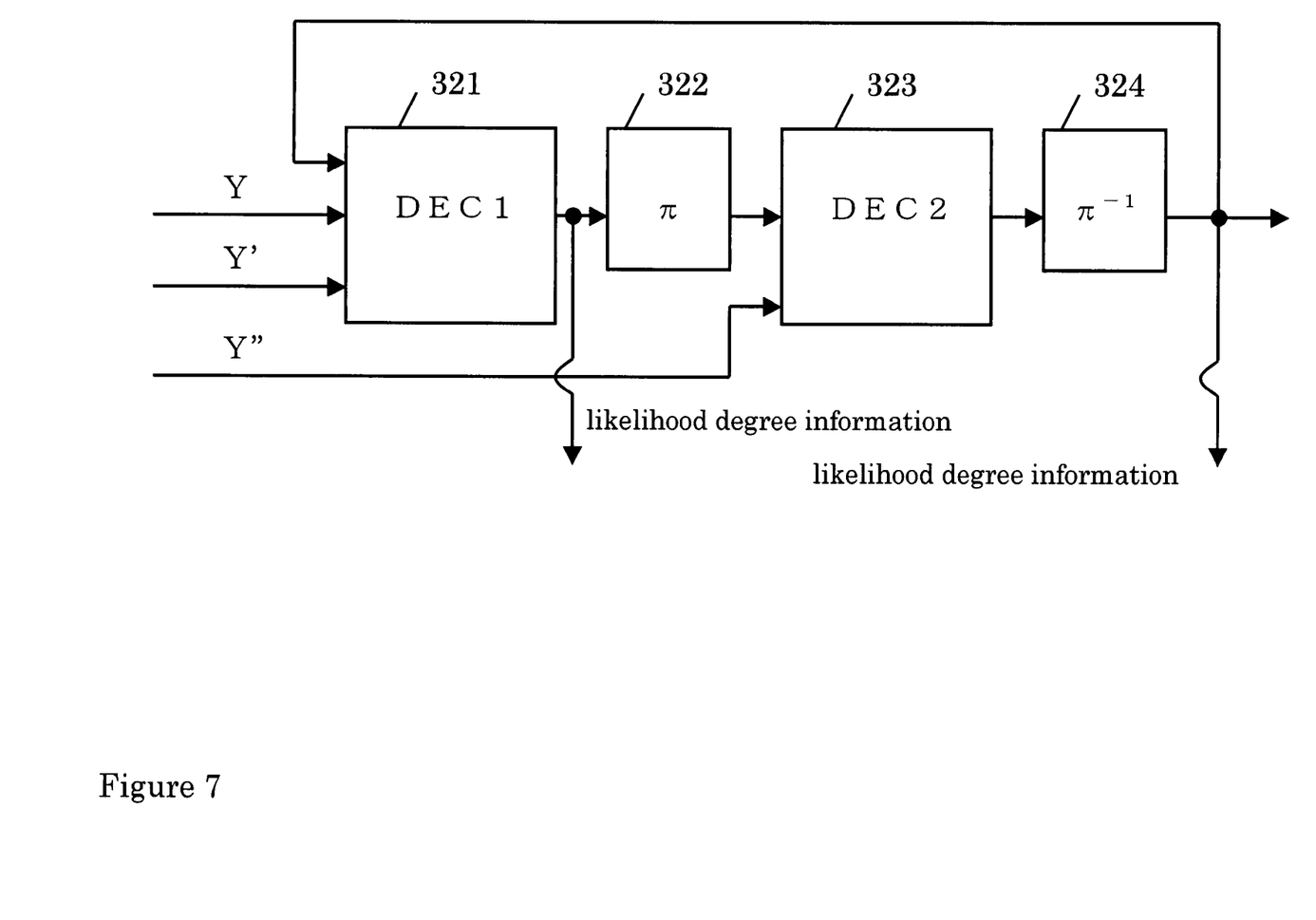
FIG. 7 diagrammatically shows a channel decoder (turbo decoder).

FIG. 7 illustrates a structure of the turbo decoder.

In FIG. 7, numeral 321 designates a first element decoder, while 323, a second element decoder. Numeral 322 designates an interleaver, while 324, a deinterleaver.

The data U, U', and U" can be obtained by the turbo coding in the transmitting side (base station side), but the received data which are information corresponding to these data are respectively indicated as Y, Y', and Y". Next, the operations will be described.

For turbo decoding, the decoding is executed with the first element decoder (DEC1) 321 using the data Y and Y' among the data Y, Y', and Y". The element decoder 321 is a soft-output element decoder and outputs a degree of likelihood as the result of decoding. Next, the similar decoding is executed with the second element decoder (DEC2) 323 using the degree of likelihood output from the first element decoder and the data Y". Namely, the second element decoder 323 is also a soft-output element decoder and outputs a degree of likelihood as the result of decoding. Since the data Y" is the received signal corresponding to the data U" obtained by the convolutional encoding of the data obtained by interleaving the information data U, the degree of likelihood output from the first element decoder 321 is interleaved with the interleaver ($\pi$) 322 before it is input to the second element decoder 323.

Degree of likelihood output from the second element decoder 323 is deinterleaved with the deinterleaver ($\pi^{-1}$) 324 and is then fed back as the input to the first element decoder 321. After this feedback process, the first element decoder executes the decoding using a set of the likelihood degree information and data Y, Y'. As a result, the result of decoding is transferred to the second element decoder 323.

As described above, the decoding result is output from the deinterleaver 324 as the result of turbo decoding through the sequential repetition of the decoding processes by the first element decoder 321 and the second element decoder 323. However, since the decoding result includes not only the determination data of "0" and "1" but also likelihood degree information, certainty of the determination data can be attained.

This likelihood degree information is also included in any of the outputs of the element decoder 321 and deinterleaver 324 and highly accurate likelihood degree information can be obtained by repeating the decoding process more times. The likelihood degree information which is assumed to have the highest accuracy is considered to be output from the deinterleaver 324 by repeating the decoding process for N times.

Numeral 33 designates a CRC check unit which executes the error detection process using the CRC bit attached to the data after the error correcting decode and notifies the result of such error detection to the control unit 34.

The control unit 34 controls each unit and also controls the transmitter 35 in accordance with existence and non-existence of the CRC error from the CRC check unit 33 to transmit the ACK and NACK signals to the base station. When a CRC error does not exist, the ACK signal is transmitted. When a CRC error exists, the NACK signal is transmitted. Accordingly, the base station performs the re-transmission when the NACK signal is received.

Moreover, the control unit 34 receives the likelihood degree information from the channel decoder 32 to obtain the average value A of the likelihood degree of the data transmitted within the sub-frame and to calculate a ratio r (=A/T) to the reference value T.

Here, the control unit 34 obtains the value of $K=[(1-r)M]$ and controls the transmitter 35 (feedback unit) to transmit the value K together with the NACK signal as the feedback information to the base station. Here, M indicates the number of spreading codes, while [n], the maximum natural number equal to or less than n. The value K may also be transmitted when the ACK signal is transmitted, but the value K is transmitted here when the NACK signal is transmitted. However, an increase in the amount of transmit data can be controlled by not transmitting the value K when the ACK signal is transmitted.

The value K is transmitted, in this case, to the base station but it is preferable that the soft-determination data obtained from the receiving unit 27 or the likelihood degree information obtained from the channel decoder themselves or the information obtained by converting these data with the predetermined function are transmitted to the base station. Such information is called the reliability information of the receive data. In this case, it is preferable to select the function that can reduce the amount of information and the previous function used for calculating the value K is an example of such a function.

The base station having received the reliability information from the mobile station determines the value Y on the basis of this reliability information. Namely, the re-transmission is determined through reception of the NACK signal and this reliability information is used for determination of the transmission parameter Y.

When the reliability information is K described previously, the number of spreading codes as the transmission parameter can be simply set to K but when the reliability information is not the information corresponding to Xi, the base station preferably determines whether the transmission parameter should be set to Y or to X on the basis of the reliability information.

Namely, when the reliability information, which is transmitted to indicates that the soft-determination data or the likelihood degree information obtained from the channel decoder have higher uncertainty for determination of the received data, is received by the base station, the transmission parameter is maintained to X, while when the reliability information, which is transmitted to indicate that the soft-determination data or the likelihood degree information obtained from the channel decoder have lower uncertainty for determination of the received data, is received by the base station, the transmission parameter is changed to Y (value having saved the radio resources for X).

Co-Existence with CQI Control

It should also be acknowledged that the control for changing the transmission parameter X with the CQI information or the like from the mobile station can also be executed in parallel.

Namely, when a mobile station, which has measured the SIR or the like as the receiving quality transmits CQI to the base station as a report thereof, the control unit 10 in the base station controls to change a transmission parameter such as adaptive modulation or the like in accordance with the CQI thereof. For example, when a good SIR is recognized with the CQI, the QPSK modulation is switched to the 16-level QAM or the number of spreading codes is increased.

In this case, the transmission parameter X varies due to control by the CQI. However, the transmission parameter Y can take the value having saved the radio resources for the transmission parameter X' after the value to be changed due to the CQI control, instead of the method for using the value having saved the radio resources for the transmission parameter X during the transmission of the data, which the mobile station have failed to receive. As a result, the control would otherwise be varied to attain excessive quality due to the control by the CQI, but the control is performed in the direction to control such variation. Moreover, the control unit 10 operates accordingly as the suppressing means for suppressing the control based on the CQI in the direction to control consumption of the radio resources.

Others

Figure 8:
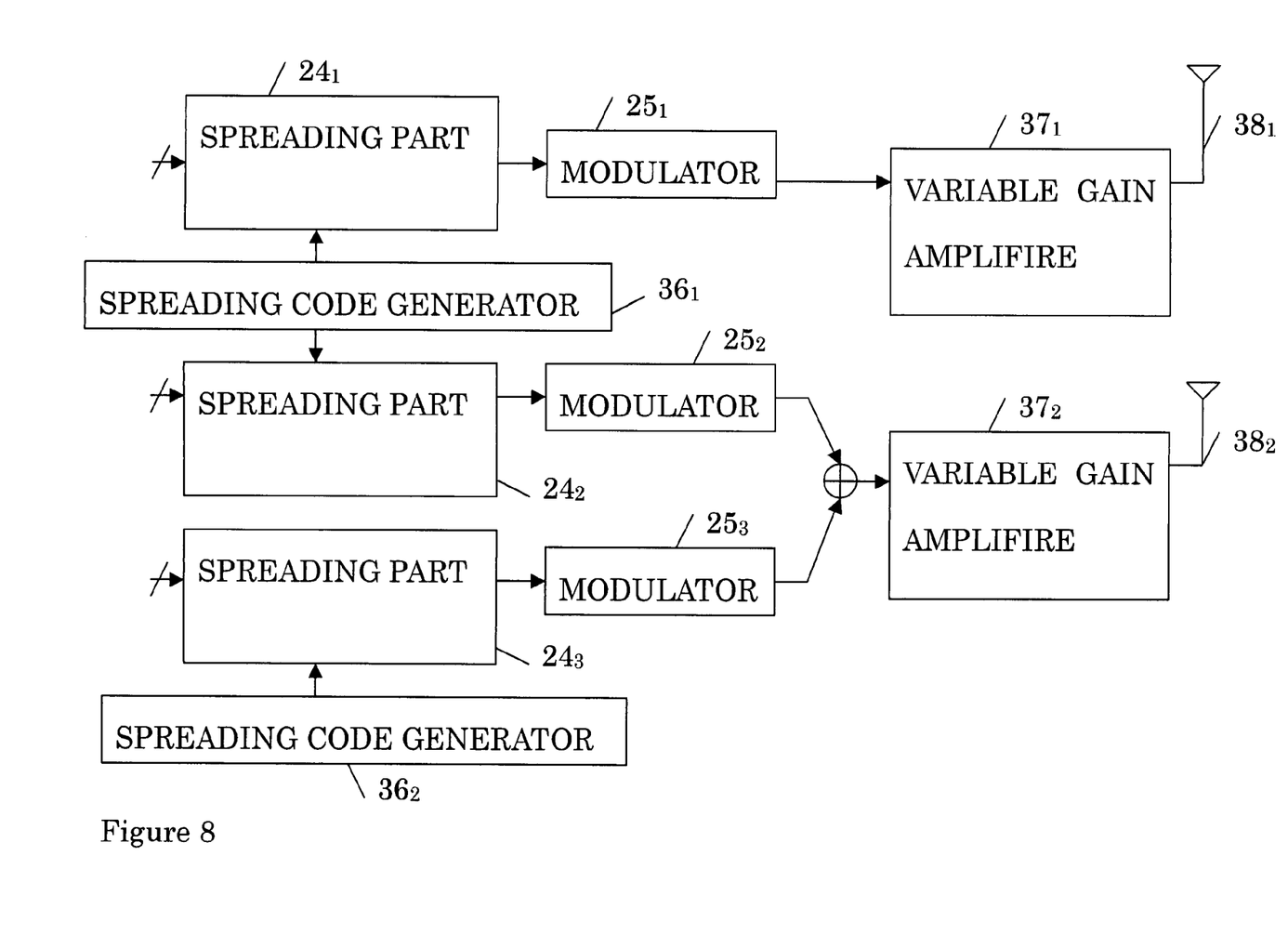
FIG. 8 diagrammatically shows the spreading process when MIMO (Multi Input Multi Output) is adapted.

Finally, the spreading process in the base station when the MIMO is employed will be described in detail. FIG. 8 illustrates a structure in the periphery of the spreading process unit in the base station when the MIMO is employed.

In this figure, the transmitting system for a base station is illustrated. Numerals $24_1$ to $24_3$ designate the spreading parts; while numerals $25_1$ to $25_3$, the modulating units; numerals $36_1$ to $36_2$, the spreading code generators; numerals $37_1$ to $37_2$, the variable gain amplifiers; and numerals $38_1$ to $38_2$, the antennas.

The signals of N systems (in this example, three systems) output from the physical channel mapping unit 23 of FIG. 3 are respectively input to the spreading parts $24_1$ to $24_3$. Since the signals spread by the spreading parts $24_1$ and $24_2$ are transmitted from individual antennas $38_1$ and $38_2$, the common spreading codes may be used as the spreading code. Accordingly, as illustrated in the figure, the common spreading codes are given to the spreading parts $24_1$ and $24_2$ from the spreading code generating unit $36_1$. However, since the signals spread by the spreading parts $24_2$ and $24_3$ are transmitted from the common antenna $38_2$, discrete spreading code may be used. Accordingly, the spreading process is executed using the spreading codes given from the spreading code generators $36_1$ and $36_2$. The signal output from each spreading part is modulated in the modulating units $25_1$ to $25_3$, the output of the modulating unit $25_1$ is then input to the variable gain amplifier $37_1$, the outputs of the modulating units $25_2$ and $25_3$ are combined and are then input to the variable gain amplifier $37_2$.

The outputs of the variable gain amplifiers $37_1$ and $37_2$ are combined, as required, with the signals to the other mobile stations and are then input respectively to the antennas $38_1$ and $38_2$. The frequency conversion is executed as required but this process is omitted in the figure.

According to the transmitting apparatus of the present invention, since transmission is made by saving the radio resources for the re-transmission, excessive quality in the receiving apparatus can be controlled or the saved radio resources may be assigned for the other receiving apparatuses.

What is claimed is:

1. A receiving apparatus to reproduce data using received data and re-transmitted data, comprising;
   a unit for determining likelihood degree information for the received data or information calculated from the likelihood degree information; and
   a feedback unit for feeding back the likelihood degree information for the received data or the information calculated from the likelihood degree information to a transmitting apparatus operable to change a transmission parameter at a time of transmission.

2. The apparatus of claim 1, wherein the transmission parameter includes at least one of a coding rate, a rate matching pattern, a number of separation based on a number of spreading codes, a modulation system, a coding rate, a number of bits of a bit sequence, a coding rate, a number of sub-carriers used, a number of levels of multi-level modulation, a number of bits not transmitted as a result of a change in a rate matching pattern, and a number of transmitting antennas used.

3. The apparatus of claim 1, wherein the information calculated from said likelihood degree information includes information to identify a transmission parameter to be changed.

4. The apparatus of claim 3, wherein the transmission parameter includes at least one of a coding rate, a rate matching pattern, a number of separation based on a number of spreading codes, a modulation system, a coding rate, a number of bits of a bit sequence, a coding rate, a number of sub-carriers used, a number of levels of multi-level modulation, a number of bits not transmitted as a result of a change in a rate matching pattern, and a number of transmitting antennas used.

5. A transmitting apparatus for transmitting data to a receiving apparatus, the receiving apparatus to reproduce data using received data and re-transmitted data, comprising;
   a receiving unit operable to receive, from the receiving apparatus, likelihood degree information of the received data or information calculated from the likelihood degree information; and
   a control unit operable to determine a transmission parameter for re-transmission and operable to execute the re-transmission using the determined transmission parameter, on the basis of the received likelihood degree information or the information calculated from the likelihood degree information.

6. The apparatus of claim 5, wherein the transmission parameter includes at least one of a coding rate, a rate matching pattern, a number of separation based on a number of spreading codes, a modulation system, a coding rate, a number of bits of a bit sequence, a coding rate, a number of sub-carriers used, a number of levels of multi-level modulation, a number of bits not transmitted as a result of a change in a rate matching pattern, and a number of transmitting antennas used.

7. The apparatus of claim 5, wherein the information calculated from said likelihood degree information includes information to identify a transmission parameter to be changed.

8. The apparatus of claim 7, wherein the transmission parameter includes at least one of a coding rate, a rate matching pattern, a number of separation based on a number of spreading codes, a modulation system, a coding rate, a number of bits of a bit sequence, a coding rate, a number of sub-carriers used, a number of levels of multi-level modulation, a number of bits not transmitted as a result of a change in a rate matching pattern, and a number of transmitting antennas used.

9. A receiving apparatus to reproduce data using receiving data and re-transmitted data comprising:
   a feedback unit for feeding back likelihood degree information of the receiving data or information calculated from said likelihood degree information to a transmitting apparatus which can control a transmission parameter at a time of retransmission.

10. A transmitting apparatus for transmitting data to a receiving apparatus, the receiving apparatus to reproduce data using received data and re-transmitted data, said transmitting apparatus comprising:
    a receiving unit for receiving, from said receiving apparatus, likelihood degree information; and
    a control unit for determining a transmission parameter at a time of re-transmission and executing the re-transmission using the determined parameter on the basis of information obtained by said reception of the likelihood degree information.

* * * * *